(12) United States Patent
Curran et al.

(10) Patent No.: US 10,266,702 B2
(45) Date of Patent: Apr. 23, 2019

(54) SELF-CLEANING COATINGS AND METHODS FOR MAKING SAME

(71) Applicants: Seamus Curran, Pearland, TX (US); Kang-Shyang Liao, Houston, TX (US); Killian Barton, Houston, TX (US)

(72) Inventors: Seamus Curran, Pearland, TX (US); Kang-Shyang Liao, Houston, TX (US); Killian Barton, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 84 days.

(21) Appl. No.: 13/913,728

(22) Filed: Jun. 10, 2013

(65) Prior Publication Data
US 2013/0337226 A1    Dec. 19, 2013

Related U.S. Application Data

(60) Provisional application No. 61/657,152, filed on Jun. 8, 2012, provisional application No. 61/667,203, filed on Jul. 2, 2012.

(51) Int. Cl.
*B05D 3/12* (2006.01)
*B05D 5/02* (2006.01)
(Continued)

(52) U.S. Cl.
CPC .............. *C09D 5/00* (2013.01); *B05D 5/083* (2013.01); *C03C 17/30* (2013.01); *C09D 5/1625* (2013.01);
(Continued)

(58) Field of Classification Search
CPC . B05D 3/002; B05D 3/12; B05D 5/02; B05D 5/08; B05D 5/083; C03C 17/30;
(Continued)

(56) References Cited

U.S. PATENT DOCUMENTS 3,354,022 A    11/1967 Dettre et al.
5,328,768 A    7/1994 Goodwin
(Continued)

FOREIGN PATENT DOCUMENTS

WO    WO-2003/015891 A1    2/2003
WO    WO-2009/118552 A1    10/2009
WO    WO-2013/019965 A1    2/2013

OTHER PUBLICATIONS

PCT International Search Report dated Mar. 19, 2014, for PCT/US2013/044913.

(Continued)

*Primary Examiner* — Kirsten Jolley
(74) *Attorney, Agent, or Firm* — Winstead PC

(57) ABSTRACT

A method of forming a self-cleaning coating on a substrate comprises the step of selecting a substrate, cleaning the substrate, and/or roughening the substrate using an abrasive. In an embodiment, roughening of the substrate create microscopic tortuous grooves. Another embodiment of the method comprises coating the roughened surface with at least one hydrophobic chemical agent. In an exemplary embodiment, the hydrophobic chemical agent covalently binds with the substrate creating nanoscopic grooves. Another embodiment of the present disclosure pertains to an apparatus for depositing a self-cleaning coating on a flat substrate. A further embodiment of the present disclosure pertains to a self-cleaning coating on a substrate comprising a hydrophobic chemical agent covalently bonded to at least one roughened surface of the substrate.

16 Claims, 13 Drawing Sheets

(51) Int. Cl.

| | | |
|---|---|---|
| *C09D 5/00* | (2006.01) | |
| *C09D 5/16* | (2006.01) | |
| *B05D 5/08* | (2006.01) | |
| *H02S 40/10* | (2014.01) | |
| *C03C 17/30* | (2006.01) | |
| *B05D 3/02* | (2006.01) | |
| *B05D 3/14* | (2006.01) | |

(52) U.S. Cl.
CPC ............ *C09D 5/1681* (2013.01); *H02S 40/10* (2014.12); *B05D 3/02* (2013.01); *B05D 3/12* (2013.01); *B05D 3/142* (2013.01); *B05D 5/02* (2013.01); *B05D 2203/35* (2013.01); *C03C 2217/76* (2013.01); *C03C 2218/31* (2013.01); *Y10T 428/24355* (2015.01); *Y10T 428/265* (2015.01)

(58) Field of Classification Search
CPC .......... C03C 2217/732; C03C 2217/78; C03C 2218/113; C03C 2203/27; C03C 228/152; C09D 5/1662; C09D 183/04; C09D 183/08; C09D 5/006; C09D 5/1625; C09D 5/1681; Y10T 428/265; Y10T 428/24355
USPC .................................. 427/289, 290, 292, 299
See application file for complete search history.

(56) References Cited

U.S. PATENT DOCUMENTS

| | | | |
|---|---|---|---|
| 5,424,130 A | 6/1995 | Nakanishi et al. | |
| 5,523,161 A | 6/1996 | Goodwin | |
| 5,853,896 A | 12/1998 | Kondo et al. | |
| 6,811,467 B1 * | 11/2004 | Beresford | B24B 37/042 451/28 |
| 7,138,186 B2 * | 11/2006 | Luten, III | C03C 17/30 427/249.15 |
| 7,635,522 B2 | 12/2009 | Cnossen et al. | |
| 7,815,737 B2 * | 10/2010 | Kim | C23C 14/12 118/715 |
| 7,901,731 B2 | 3/2011 | Russell et al. | |
| 2002/0150724 A1 | 10/2002 | Nun et al. | |
| 2004/0018301 A1 | 1/2004 | Ackerman et al. | |
| 2006/0029808 A1 | 2/2006 | Zhai et al. | |
| 2006/0113231 A1 | 6/2006 | Malik | |
| 2006/0292345 A1 | 12/2006 | Dave et al. | |
| 2008/0058489 A1 | 3/2008 | Edelmann et al. | |
| 2008/0063859 A1 | 3/2008 | Fath | |
| 2008/0113188 A1 | 5/2008 | Shah et al. | |
| 2008/0176060 A1 | 7/2008 | Harold et al. | |
| 2009/0011222 A1 | 1/2009 | Xiu et al. | |
| 2009/0148711 A1 | 6/2009 | Le Blanc et al. | |
| 2010/0034976 A1 | 2/2010 | Fregonese et al. | |
| 2010/0112208 A1 | 5/2010 | Malik et al. | |
| 2010/0203287 A1 | 8/2010 | Jiang et al. | |
| 2010/0239824 A1 | 9/2010 | Weitz et al. | |
| 2010/0249445 A1 | 9/2010 | Yan et al. | |
| 2010/0255311 A1 | 10/2010 | Lee et al. | |
| 2011/0159289 A1 | 6/2011 | Blizzard | |
| 2011/0250422 A1 | 10/2011 | Kessman et al. | |
| 2011/0250428 A1 | 10/2011 | Leventis et al. | |
| 2012/0040179 A1 | 2/2012 | Dave | |
| 2012/0141805 A1 | 6/2012 | Wang et al. | |
| 2012/0156495 A1 | 6/2012 | Auger | |
| 2012/0213935 A1 | 8/2012 | Fregonese et al. | |
| 2013/0004137 A1 | 1/2013 | Jin et al. | |
| 2013/0055927 A1 | 3/2013 | Satoh et al. | |
| 2013/0095237 A1 | 4/2013 | Kalyankar et al. | |
| 2014/0342098 A1 | 11/2014 | Curran et al. | |

OTHER PUBLICATIONS

Furmidge, C.G. L., J. Colloid Sci. 1962, 17, 309-324.
Parkin, IP et al. "Self-cleaning coatings" J. Mater. Chem., vol. 15, Apr. 2005, pp. 1689-1695.
Liao, K-S., Wan, A., Batteas, J. D., Bergbreiter, D.E., "Superhydrophobic surfaces formed using layer-by-layer self-assembly with aminated multiwall carbon nanotubes" Langmuir 2008, 24, 4245-4253.
Gao, L. et al. Wetting 101°, Langmuir 2009, 25(24), 14105-14115.

* cited by examiner

SELF-CLEANING COATINGS AND METHODS FOR MAKING SAME

CROSS-REFERENCE TO RELATED APPLICATIONS

This application claims priority to U.S. Provisional Application No. 61/657,152 filed on Jun. 8, 2012 and U.S. Provisional Patent Application No. 61/667,203 filed on Jul. 2, 2012. The entireties of the aforementioned applications are incorporated herein by reference.

STATEMENT REGARDING FEDERALLY SPONSORED RESEARCH

The invention was supported, in whole or in part, by grant number DD-N000141110069, awarded by the U.S. Department of Defense. The U.S. Government has certain rights in the invention.

FIELD

This invention relates to methods and instrumentations for making self-cleaning substrates.

BACKGROUND

Self-cleaning surfaces are desired for paints, construction materials, glass and windows, textiles, and more. Such self-cleaning coatings provide protection from dirt and wear and improve in certain circumstances the aesthetic qualities and lifetime of industrial and consumer articles thereby reducing the need for chemical detergents, labor and energy expenditure. In other instances there can also be a need to have a hydrophobic or superhydrobic coating as a protective mechanism against the damage of water, salt water or other such water based fluids. While varieties of materials and processes for artificial hydrophobic or superhydrophobic coatings, using methods such as chemical vapor deposition, layer-by-layer assembly and micro-patterning, have been reported, all of these methods and coatings require complicated application processes which are difficult to apply to large substrates. Therefore, there is a need to develop "self-cleaning" (where hydrophobic coatings along with water for instance can remove dirt/dust particles and not to be confused with oleophobic coatings) coatings and methods of applying self-cleaning coatings to any substrate, that are effective and do not change the transmittance property of substrates.

SUMMARY

An embodiment of the present disclosure relates to a method of forming a self-cleaning coating on a substrate. Such a method comprises the step of selecting a substrate. In an embodiment, the substrate may be a flat or a non-flat substrate. In a related embodiment, the substrate may comprise of metals, metal oxides, plastic with silicon dioxide, or a metal oxide layers. In an embodiment, such a method comprises the step of cleaning the substrate. In another embodiment, the method comprises the step of roughening the substrate. In a related embodiment, the roughening may be accomplished can be done mechanically, chemically, optically or by using a plasma. In an embodiment, roughening of the substrate creates microscopic tortuous grooves on the substrate. In another embodiment, the method comprises the step of coating the roughened surface with at least one hydrophobic chemical agent. In an exemplary embodiment, the hydrophobic chemical agent covalently binds with the substrate creating nanoscopic grooves on the roughened surface coated with the hydrophobic chemical agent. In an embodiment, the hydrophobic chemical agent is a Fluoroalkylsilane. In another embodiment, the coated substrate has a light transmission or reflection similar to or higher than that of the uncoated substrate.

Another embodiment of the present disclosure pertains to an apparatus for depositing a self-cleaning coating on a substrate. Such an apparatus comprises a station for forming microscopic grooves on the substrate, where an abrasives roughens the substrate. In some embodiments, the station for creating microscopic grooves additionally comprises a dehumidifier. In an exemplary embodiment, the station may also comprise an outlet for reaction byproducts and gas, optionally fitted with chemical filters. In an embodiment, the apparatus comprises a coating chamber for coating the substrate with at least one hydrophobic chemical agent. In an exemplary embodiment, the coating of the hydrophobic chemical agent creates nanoscopic grooves on the roughened substrate. In an embodiment, the hydrophobic chemical agent is a Fluoroalkylsilane. In an embodiment, the coating chamber additionally comprises a dehumidifier. In another embodiment, the coating chamber may also comprise an outlet for reaction byproducts and gas, optionally fitted with chemical filters. In a related embodiment, the apparatus may comprise a drying chamber. In all embodiments, the station is operatively connected to transport the substrate to the coating chamber and the coating chamber is operatively connected to transport the substrate to the drying chamber.

A further embodiment of the present disclosure pertains to a self-cleaning coating on a substrate comprising a hydrophobic chemical agent covalently bonded to at least one roughened surface of the substrate. In an embodiment, the covalent bonding of the hydrophobic chemical agent creates nanoscopic grooves on the roughened surface of the substrate. In a related embodiment, the coating renders the substrate self-cleaning when tilted above a critical angle $\alpha$.

BRIEF DESCRIPTION OF THE DRAWINGS

In order that the manner in which the above recited and other advantages and objects of the invention are obtained, a more particular description of the invention briefly described above will be rendered by reference to specific embodiments thereof, which are illustrated in the appended Figures. Understanding that these Figures depict only typical embodiments of the invention and are therefore not to be considered limiting of its scope, the invention will be described with additional specificity and detail through the use of the accompanying Figures in which.

DETAILED DESCRIPTION

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

The present disclosure relates to methods of forming self-cleaning coatings on substrates and apparatuses for the application of self-cleaning coatings on different substrates.

Self-cleaning or superhydrophobic surface finishes inspired by the self-cleaning mechanism of lotus plants and other organisms (e.g., many large-winged insects) are desirable in numerous applications across various industries. In recent years, self-cleaning surfaces have attracted significant interest not only because of their potential applications in the industry but also because of a renewed interest in the fundamental understanding of wetting behavior that has been inspired by superhydrophobic properties exhibited by living organisms observed in nature. For instance, Lotus plants (*Neliumbo nucifera*) stay dirt-free, an obvious advantage for an aquatic plant living in typically muddy habitats, and they do so without using detergent or expending energy. The plant's cuticle, like that of other plants, is made up of soluble lipids embedded in a polyester matrix—wax—but the degree of its water repellency is extreme (superhydrophobic). This is accomplished through the micro-topography of their leaf surfaces, which while showing a variety of structures, all share a similar mathematical set of proportions associated with superhydrophobicity.

The terms "superhydrophobic" and "self-cleaning" may be defined in various manners. For example, a superhydrophobic surface may be defined to have a minimum static contact angle of 150° and a maximum sliding angle of 5°. In addition, the terms "superhydrophobic" and "self-cleaning" are sometimes used interchangeably.

Figure 1:
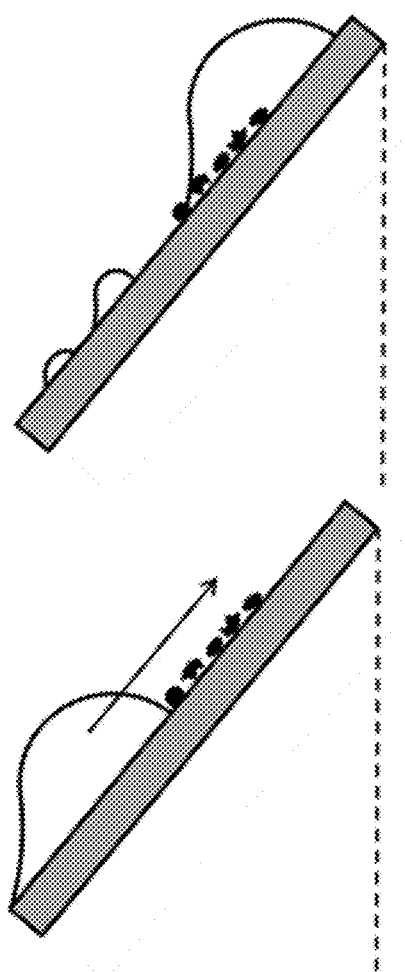
FIG. 1 describes a general phenomenon where a water droplet slides down a tilted substrate surface. Due to the strong surface tension between the substrate surface and water, the water droplet tends to break into small droplets, leaving a trail of smaller water droplets as a result of such breakdown. The adhesion between the dust particles and the substrate surface also prevents the particles being washed away by the movement of a water droplet.

FIG. 1 describes a general phenomenon where a water droplet slides down a tilted substrate surface of common materials such as glass (that has no coating). Due to the strong surface tension between the substrate surface and water, the water droplet tends to break into small droplets and leaves a trail of smaller water droplets. The adhesion between the dust particles and the substrate surface also prevents the particles being washed away (depicted in black) by the movement of a water droplet.

Figure 2:
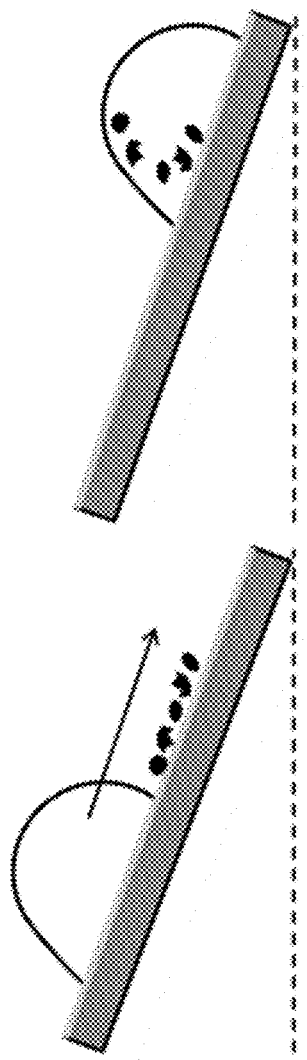
FIG. 2 describes the phenomenon where a water droplet slides down a tilted substrate surface that has been previously treated with a self-cleaning coating. Due to the greatly reduced surface tension between water and the coated substrate surface, the water droplet slides down leaving no trail. The adhesion between the dust particles and the coated substrate surface is also reduced so the particles are washed away by the movement of a water droplet.

By contrast, FIG. 2 describes a phenomenon where a water droplet slides down a tilted substrate surface that has been previously treated with a "self-cleaning" coating. Due to the greatly reduced surface tension between water and the coated substrate surface, the water droplet slides down without any remnant of the droplet adhering to the surface. The adhesion between the dust particles and the coated substrate surface is also reduced so the particles are washed away (depicted in black) by the movement of a water droplet.

Figure 3:
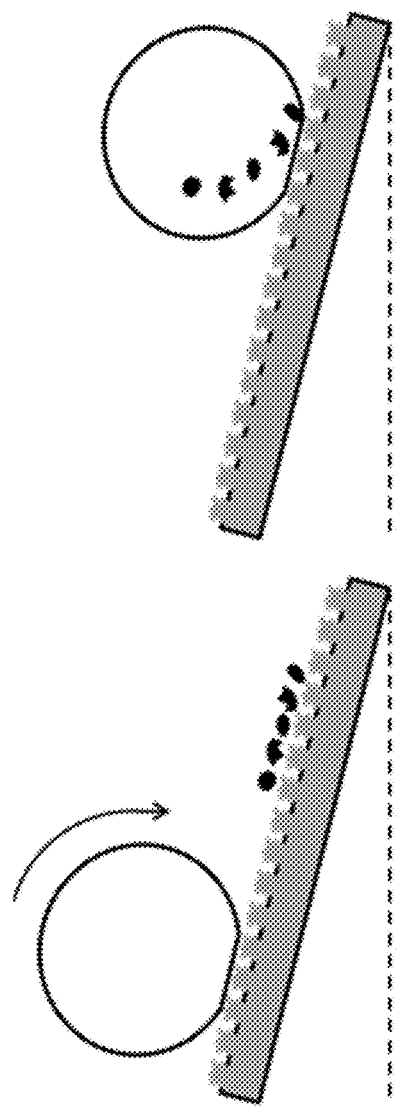
FIG. 3 describes the phenomenon of a water droplet rolls down a tilted substrate surface treated that has been previously treated with a self-cleaning coating. Due to the greatly reduced surface tension and contact area between water and the coated substrate surface, the water droplet rolls down leaving no trail. The adhesion between the dust particles and the coated substrate surface is also reduced so the particles are washed away by the movement of a water droplet.

FIG. 3 describes yet another phenomenon where a water droplet rolls down a tilted substrate surface that has been previously treated with a "self-cleaning" coating. Due to the greatly reduced surface tension and contact area between water and the coated substrate surface, the water droplet rolls down leaving no trail. The adhesion between the dust particles and the coated substrate surface is also reduced so the particles are washed away (depicted in black) when they are in contact with the water droplet.

Figure 4:
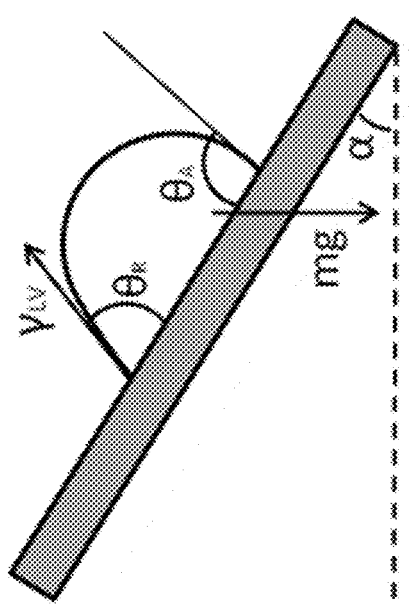
FIG. 4 describes the parameters used to describe the sliding event of a water droplet on a substrate surface where a is the critical angle for a given water droplet starts to sliding down the substrate surface, m is the mass of the water droplet, g is the gravitational constant, and $\theta_R$ and $\theta_A$ are the receding contact angle and the advancing contact angle of the water droplet on a substrate surface, respectively. $\gamma_{LV}$ is the surface tension between the liquid (water) and the vapor (air) interface.

To describe more accurately the above-mentioned phenomena that involve water sliding, it is important to first understand the physics of wetting and the sliding event of a liquid on a solid surface. When a drop moves on a surface, it has to both advance on the downhill side and recede on the uphill side as illustrated in FIG. 4. The force required to begin the motion of the drop is a function described as eq. (1).

$$mg/w(\sin \alpha) = \gamma_{LV}(\cos \theta_R - \cos \theta_A) \quad (1)$$

where α is the critical angle for a given water droplet starts to moving down the substrate surface, m is the mass of the water droplet, g is the acceleration due to gravity, w is the width horizontal to the direction of drop movement, and $\theta_R$ and $\theta_A$ are the receding contact angle and the advancing contact angle of the water droplet on a substrate surface, respectively. The difference between advancing and receding contact angles is termed hysteresis. $\gamma_{LV}$ is the surface tension between the liquid (water) and the vapor (air) interface.

Hence, a "self-cleaning" event is best described when water drops with a set volume (thus, a set mass) can move by sliding, rolling or some combination of the two when the "self-cleaning" substrate is tilted above the critical angle α.

Due to the greatly reduced surface tension between water and the "self-cleaning" surface, the water droplet slides down leaving no trail. Dirt/dust particles may be washed away by sliding or rolling water droplets due to the reduced adhesion of dirt to the "self-cleaning" surface once the particles are sufficiently small enough to be gathered up by the liquid.

Figure 5:
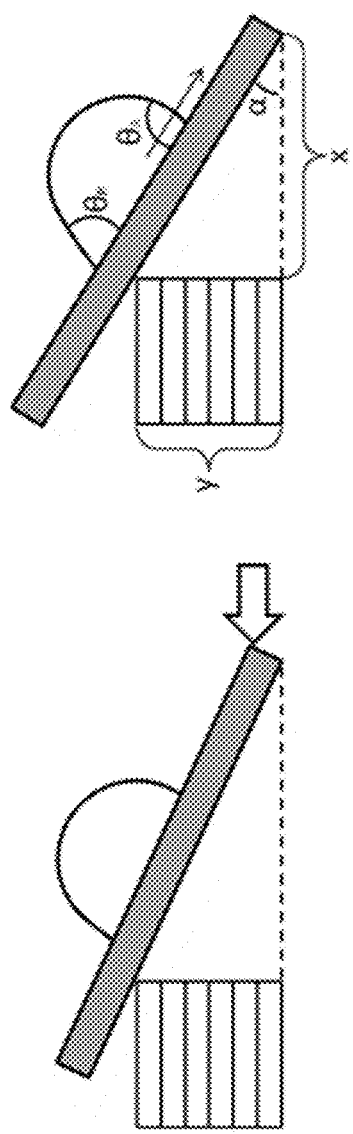
FIG. 5 describes the method for the measurement of the critical water sliding (rolling) angle. A sessile drop of water with a set volume is placed on the substrate surface tilted at a lower angle than α. A force pushes at the end of the substrate slowly raising it up until the water droplet starts to slide (roll). A right triangle is formed by the incline plane (hypotenuse) and the horizontal surface as shown. The critical angle α can be calculated as $\tan^{-1}(y/x)$, wherein y=length of the opposite leg of the right triangle and x=length of the adjacent leg of the right triangle.

A method for the measurement of the critical water sliding (rolling) angle is shown in FIG. 5. A sessile drop of water with a set volume is placed on the substrate surface tilted at a lower angle than $\alpha$. A force pushes at the bottom end of the substrate slowly raising it up until the water droplet starts to slide (roll). A right triangle is formed by the incline plane (hypotenuse) and the horizontal surface as shown (FIG. 5). The critical angle $\alpha$ is then calculated as $\tan^{-1}(y/x)$, wherein y=length of the opposite leg of the right triangle and x=length of the adjacent leg of the right triangle.

Man-made (artificial) self-cleaning surfaces are most commonly fabricated in one of two general ways. They can either be produced by creating hierarchical micro/nanostructures on hydrophobic substrates or by chemically modifying a micro/nanostructured surface with molecules of low surface free energy.

While varieties of artificial hydrophobic/superhydrophobic coatings using methods such as chemical vapor deposition, layer-by-layer assembly and micro-patterning have been reported, all of these methods require complicated manufacturing processes which are difficult to apply to large substrates and surfaces. The present disclosure overcomes this limitation. This is achieved by initially roughening the substrate surface and subsequently coating the roughed surface with an appropriate chemical agent such as but not limited fluoroalkylsilane and/or related chemicals.

Figure 6:
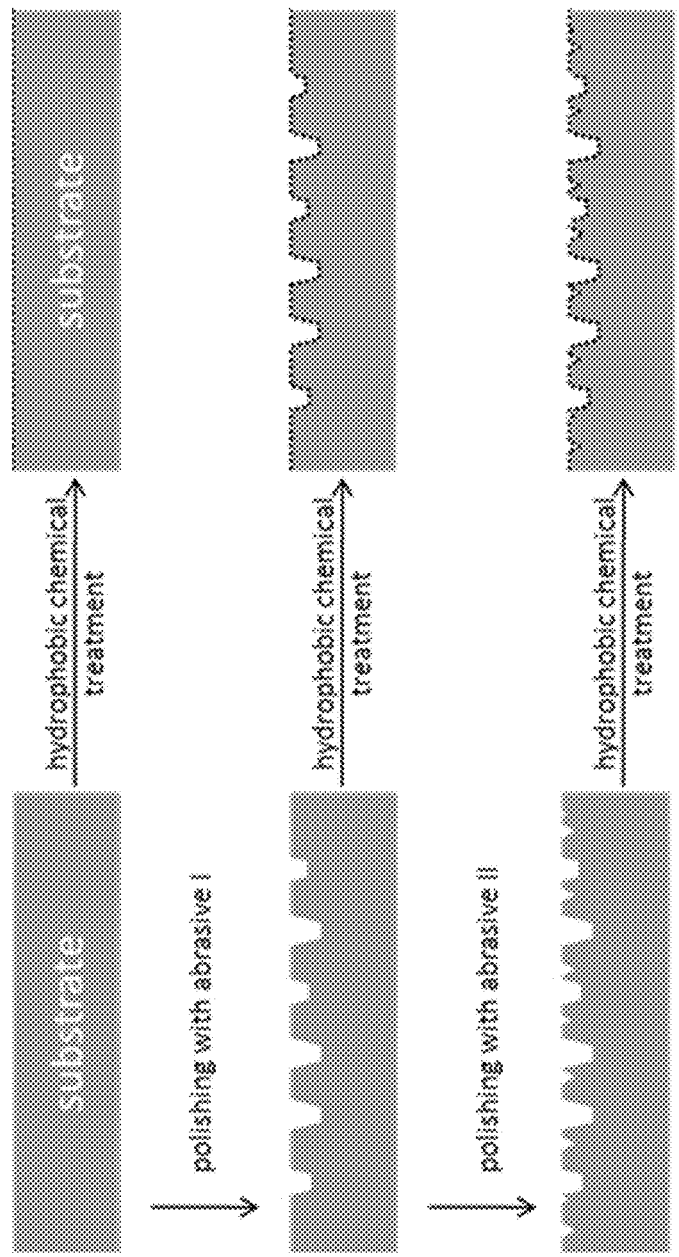
FIG. 6 describes methods to produce self-cleaning coating on a substrate. The substrate is roughed with abrasives that are harder than the substrate itself in order to generate microscopic tortuous grooves. The resulting surface is then treated with hydrophobic chemicals such as fluoroalkylsilanes which renders the surface hydrophobic and also generates nanoscopic topography.
Figure 7:
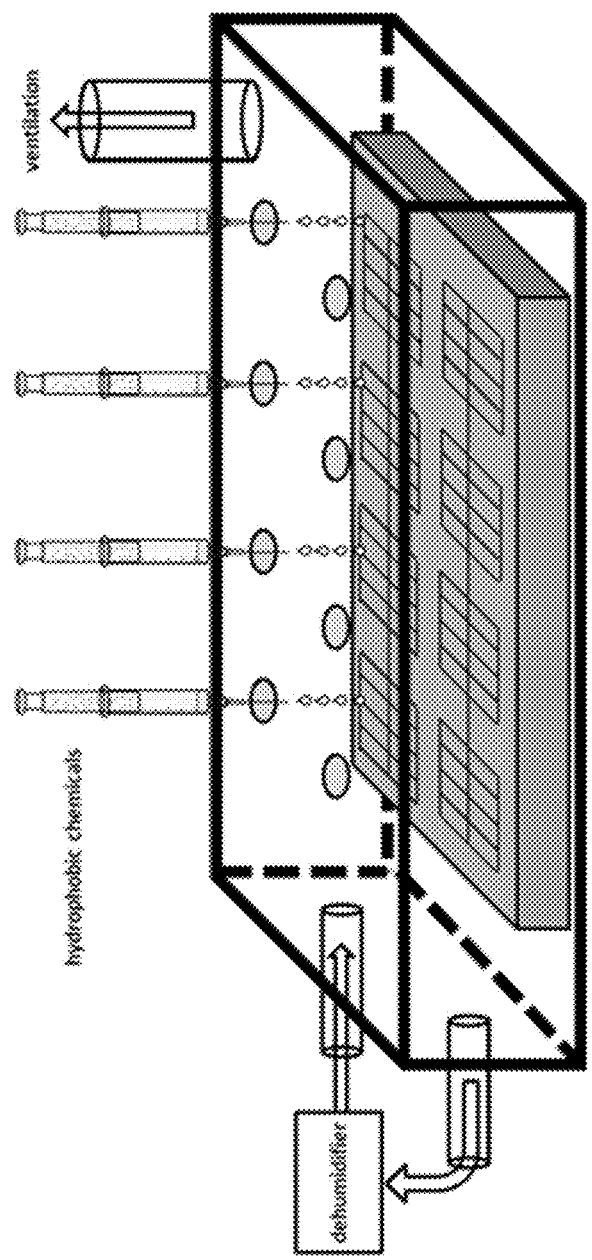
FIG. 7 describes methods for conducting the hydrophobic treatment on a large substrate such as a solar panel. The hydrophobic solution such as fluoroalkylsilanes in anhydrous solvent is injected through several re-sealable rubber septa. The humidity level is controlled though the dehumidifier to the optimized level of related humidity. An extra opening on top is used for ventilation.

More specifically, embodiments of the present invention relate to compositions and methods for making self-cleaning coatings which comprises the following steps: Step 1) Choosing any substrate of interest. By way of example, the substrates can be but not limited to silicon dioxide, metals/metal oxides, organic/inorganic composites containing metals/metal oxides and plastic with silicon dioxide or metal oxides layer by sol-gel formation or other methods. Step 2) Mechanically roughening the substrate surface using abrasives to generate microscopic tortuous grooves of depth of about 1 μm to 1 mm as illustrated in FIG. 6, which is achieved using a mechanical grinder/polisher, and if necessary, in coupling with grinding disc/abrasive paper and polishing suspensions. The abrasive is selected from the group consisting of diamond, carbonado, boron, boron nitride, corundum, silicon carbide, tungsten carbide, titanium carbide, chromium, silicon nitride, topaz, zirconia, tungsten, quartz and glass. Optimal roughening may also be achieved using high intensity UV sources, ozone treatments likewise can roughen the surfaces and make them chemically active for the second step process, and Step 3) Coating the roughened substrate with a hydrophobic chemical agent under a controlled environment if necessary (as illustrated in FIG. 7), such chemical agent may be fluoroalkylsilanes or related chemicals to create a hydrophobic surface with nanoscopic features of about 10 nm to 1 μm.

Roughened surfaces tend to reduce adhesive force on water droplets, as trapped air in the interstitial spaces of the roughened surface result in a reduced liquid-to-solid contact area. This allows the self-attraction of the polar molecule of water to express more fully, causing it to form spheres. Dirt particles on the surface of the substrate stick to these droplets, both due to natural adhesion between water and solids and because contact with the substrate's surface is reduced by over 95% from the substrate's micro-topography. The slightest angle in the surface of the substrate then causes the balls of water to roll off due to gravity, taking the attached dirt particles with them and cleaning the substrate.

Creating a Self-Cleaning Surface

Referring to FIG. 6, in an exemplary embodiment, the self-cleaning surface on a substrate is produced by first polishing the substrate with a first abrasive (abrasive I) to generate microscopic tortuous grooves. Depending on the critical angle requirement for different applications (e.g. <90° for windows; roughly 30° for solar panels and automobile windshields; and roughly 10° for sunroofs), the resulting substrate may be polished with a second abrasive (abrasive II) to generate a secondary microscopic feature. To generate the desired microscopic feature, a mechanical polisher is used in couple with polishing paper and diamond suspension. The self-cleaning coating system described herein includes two microscopic tortuous surface features generated by roughing the glass with two diamond abrasives having different grain sizes (1 μm and 0.1 μm) in a liquid suspension consecutively to generate a self-cleaning coating with a critical angle inferior to 30°. Generally speaking, the preferred choice of abrasives (for Step 2) is such that the hardness of abrasives is greater than that of the chosen substrate. By way of example, abrasives may include but are not limited to diamond dust, silicon carbide, ceramic, metal oxide and glass powder. The abrasive material may exist as either a solid form in combination with other binding materials (such as grinding disc and abrasive paper) or as a liquid suspension. Typical abrasive grain sizes may range from 10 nm to 10 mm.

Referring to the FIG. 6, the resulting surface is then treated with hydrophobic chemical agents, which renders the surface hydrophobic and also generates nanoscopic topography. An example of hydrophobic chemical agents used as coating in Step 3 includes at least one type of fluoroalkylsilane covalently bonded to the resulting surface, which renders the surface hydrophobic and also generates nanoscopic topography. The preferred fluoroalkylsilane species may include trichloro(3,3,3-trifluoropropyl)silane, dichloromethyl(3,3,3-trifluoropropyl)silane, chloro-dimethyl(3,3,3-trifluoropropyl)silane, trichloro(1H,1H,2H,2H-perfluorooctyl)silane, dichloro-methyl(1H,1H,2H,2H-perfluorooctyl)silane, chloro-dimethyl(1H,1H,2H,2H-perfluorooctyl)silane, trichloro(3,3,4,4,5,5,6,6,7,7,8,8,8-tridecafluorooctyl)silane, dichloro-methyl(3,3,4,4,5,5,6,6,7,7,8,8,8-tridecafluorooctyl)silane, chloro-dimethyl(3,3,4,4,5,5,6,6,7,7,8,8,8-tridecafluorooctyl)silane, trichloro(1H,1H,2H,2H-perfluorodecyl)silane, dichloro-methyl(1H,1H,2H,2H-perfluorodecyl)silane, chloro-dimethyl(1H,1H,2H,2H-perfluorodecyl)silane, trichloro(1H,1H,2H,2H-perfluorododecyl)silane, dichloro-methyl(1H,1H,2H,2H-perfluorododecyl)silane, chloro-dimethyl(1H,1H,2H,2H-perfluorododecyl)silane and derivatives bearing similar structures. Other chemical agents may also be used or in conjunction with fluoroalkylsilanes to perform similar tasks to render the surface hydrophobic and also to generate nanoscopic topography. The preferred chemical species may include chlorosilane, dichlorosilane, trichlorosilane, chlorotrimethylsilane, dichlorodimethylsilane, trichloromethylsilane, chlorophenylsilane, dichlorophenylsilane, trichlorophenylsilane, chloromethylphenylsilane, chlorodimethylphenylsilane, dichloromethylphenylsilane, chloromethylphenethylsilane, dichloromethylphenethylsilane, trichlorophenethylsilane, chlorodimethyldodecylsilane, dichloromethyldodecylsilane, trichlorododecylsilane, chlorodecyldimethylsilane, dichlorodecylmethylsilane, trichlorodecylsilane, chlorodimethyloctadecylsilane, dichloromethyloctadecylsilane, trichlorooctadecylsilane, chlorodimethyloctylsilane, dichloromethyloctylsilane, trichlorooctylsilane, chlorodimethylhexylsilane, dichloromethylhexylsilane, trichlorohexylsilane, chlorodimethylthexylsilane, dichloromethylthexylsilane, trichlorothexylsilane, allyldichloromethylsilane, allylchlorodimethylsilane, allyltrichlorosilane, (cyclohexylmethyl)chlorodimethylsilane, (cyclohexylmethyl)dichloromethylsilane, (cyclohexylmethyl)trichlorosilane and derivatives bearing similar structures. To generate the desired nanoscopic topography, a well-controlled environment may be needed for the hydrophobic treatment.

Referring to FIG. 7, it describes the enclosure for conducting the hydrophobic treatment on a substrate such as a solar panel. The solution of hydrophobic chemicals in anhydrous toluene is injected through several re-sealable rubber septa. In order to generate nanoscopic topography, extra water molecules may be needed to promote polymerization of the hydrophobic chemicals. The humidity level is controlled though the dehumidifier to be about 20% of related humidity. An extra opening on top is used for ventilation. After the reaction between the hydrophobic chemicals and the surface is completed, the excess amount of the chemical solution is removed and the surface is washed with anhydrous toluene. The resulting substrate is removed from the enclosure and dried under ambient conditions. In the preferred embodiment, the self-cleaning coating system described here uses trichloro(1H,1H,2H,2H-perfluorooctyl) silane to render the surface hydrophobic and generates nanoscopic topography.

In a preferred embodiment of the present invention the resulting self-cleaning coatings show no apparent loss of transmission of the visible light to the substrate. Such self-cleaning coatings are therefore well suited for a range of applications including the self-cleaning of solar panels. Other applications include but are not limited to products that require regular cleaning of their surface in order to maintain their proper functions, such as for example automobile windshields, windows, and sunroofs. The self-cleaning coatings may also have the desired properties for corrosion protection and anti-fouling of metallic structures.

Self-Cleaning Coating Exhibits Self-Cleaning Properties

Figure 8:
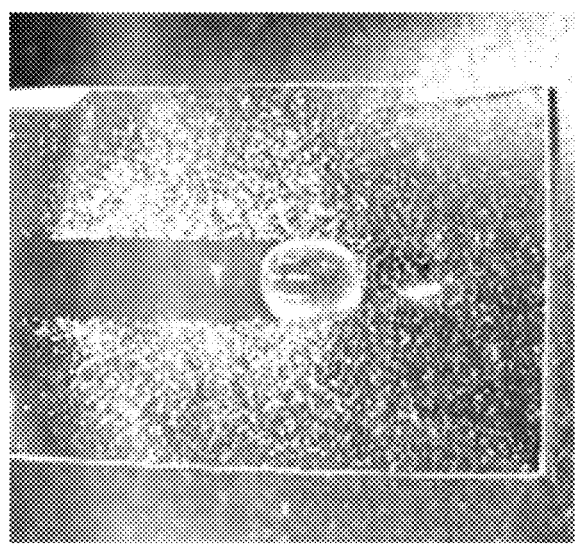
FIG. 8 demonstrates the self-cleaning property of the coating produced on a glass slide according to the embodiments of this invention. A water droplet slides down the surface leaving no trail and dirt particles (sand) are washed away completely.

In an exemplary embodiment of the present invention the resulting self-cleaning coating exhibit self-cleaning properties. A pre-cleaned plain glass slide (Corning) is polished for 3 minutes with a 0.1 µm polycrystalline diamond suspension (MetaDi, Buehler) using a polishing cloth (MasterTex, Buehler) attached to a mechanical polisher. The polished glass is cleaned with soap water and washed with de-ionized water thoroughly. After drying, the glass is transferred into a controlled environment with relative humidity level of 16% and submerged into a solution of trichloro(1H,1H,2H,2H-perfluorooctyl)silane in anhydrous toluene. After 20 minutes, the glass is removed from the solution and washed with anhydrous toluene. The treated glass is cleaned with soap water and washed with de-ionized water thoroughly. The transmission of the resulting coating at the visible light range remains the same as pristine glass (the difference of transmission is below the errors of a common UV-vis spectrometer). The critical angle for a 0.05 mL sessile drop of de-ionized water to sliding down the coated surface is about 23°. FIG. 8 demonstrates the self-cleaning property of such coating where a water droplet slides down the surface leaving no trail and dirt particles (sand) are washed away completely.

In another preferred embodiment, a pre-cleaned smooth aluminum plate is polished with 1.0 and 0.1 µm polycrystalline diamond suspension (MetaDi, Buehler) consecutively using a polishing cloth (MasterTex, Buehler) attached to a mechanical polisher. The polished aluminum is cleaned with soap water and washed with de-ionized water thoroughly. After drying, the aluminum plate with mirror-like surface is placed in an ozone plasma environment for 1 hour. The aluminum is transferred into a controlled environment with relative humidity level of 16% and submerged into a solution of trichloro(1H,1H,2H,2H-perfluorooctyl)silane in anhydrous toluene. After 30 minutes, the glass is removed from the solution and washed with anhydrous toluene. The treated aluminum is cleaned with soap water and washed with de-ionized water thoroughly. The transmission of the resulting coating at the visible light range remains the same as the pristine aluminum surface (the difference in reflection is undetectable by common human eyes). The critical angle for a 0.05 mL sessile drop of de-ionized water to sliding down the coated surface is less than 30°.

Self-Cleaning Surfaces for Larger Substrates

Figure 9:
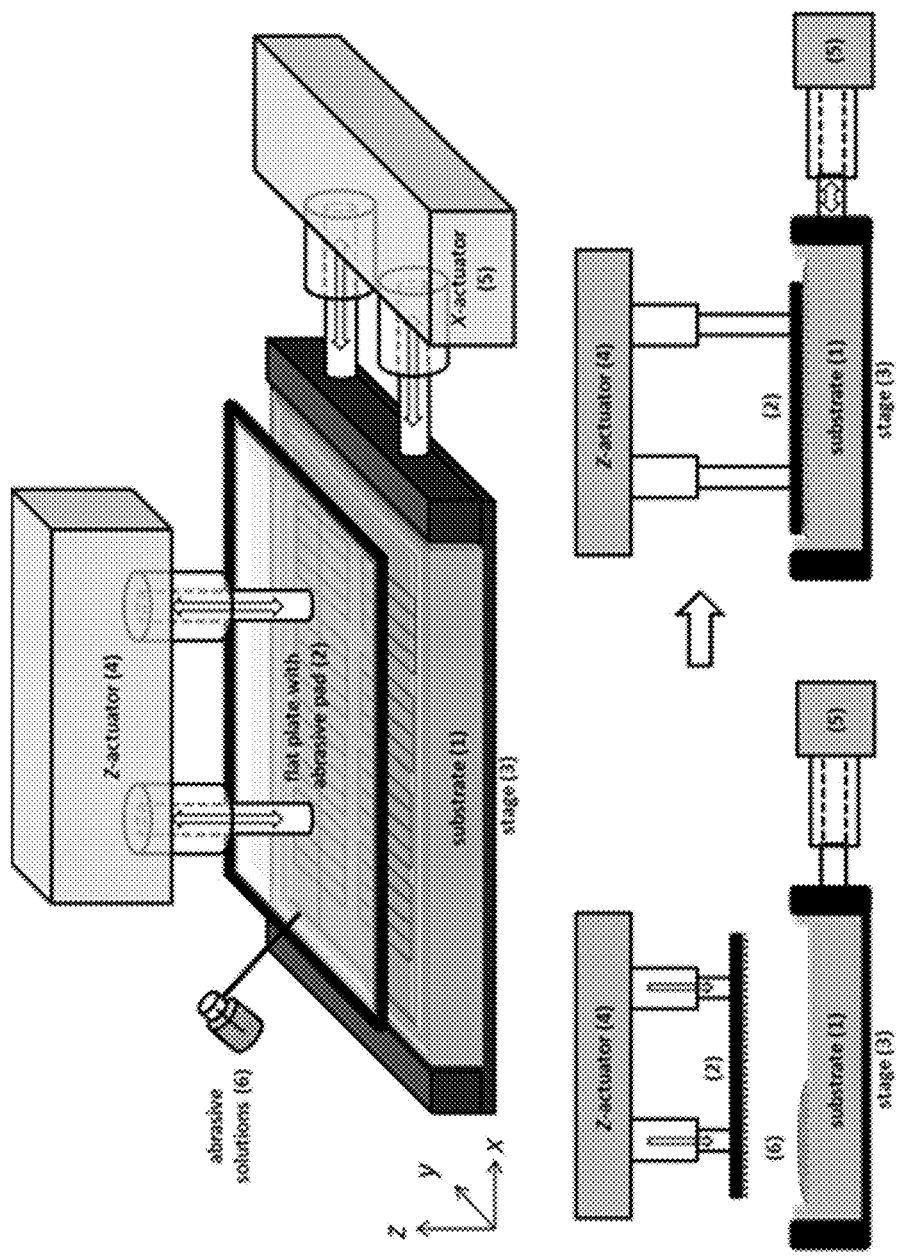
FIG. 9 describes the processes that uses abrasives for roughing the large substrate (1) of size varying from 0.01 m$^2$ to 100 m$^2$ such as, for example, the glass surface of a solar panel. Abrasives may include but are not limited to diamond dust, silicon carbide, ceramic, metal oxide and glass powder. The substrate is loaded onto the station composed of a flat plate, a stage and two actuators. A flat plate (2) with an abrasive pad attached below is controlled by the Z-actuator (3) along the Z-axis to contact with the substrate surface. The substrate is locked into a stage (4) which is controlled by the X-actuator (5) along the X-axis. The process starts with the injection of abrasive solutions (6) onto the substrate surface. The flat plate with an abrasive pad is moved down to contact with the substrate and to spread the abrasive solutions over the whole surface. The back-and-forth motion of the stage along the X-axis with reference to the stationary flat plate therefore moves the abrasives to rough the substrate surface. If necessary, the same motion along the Y-axis can be added with a Y-actuator (not shown here)

To generate the desired microscopic tortuous grooves on a larger substrate, well-controlled processes are needed for roughing the surface. Referring to FIG. 9, the invention is exemplified in a preferred embodiment wherein a roughed substrate is produced on the large substrate (1) such as the glass surface of a solar panel using abrasives. The substrate is loaded onto the station composed of a flat plate, a stage and two actuators. A flat plate (2) with an abrasive pad attached below is controlled by the Z-actuator (3) along the Z-axis to contact with the substrate surface. The substrate is locked into a stage (4) that is controlled by the X-actuator (5) along the X-axis. The process starts with the injection of abrasive solutions (6) onto the substrate surface. The flat plate with an abrasive pad is moved down to contact with the substrate and to spread the abrasive solutions over the whole surface. The back-and-forth motion of the stage along the X-axis with reference to the stationary flat plate therefore moves the abrasives to rough the substrate surface. If necessary, the same motion along the Y-axis can be added with a Y-actuator (not shown here).

Figure 10:
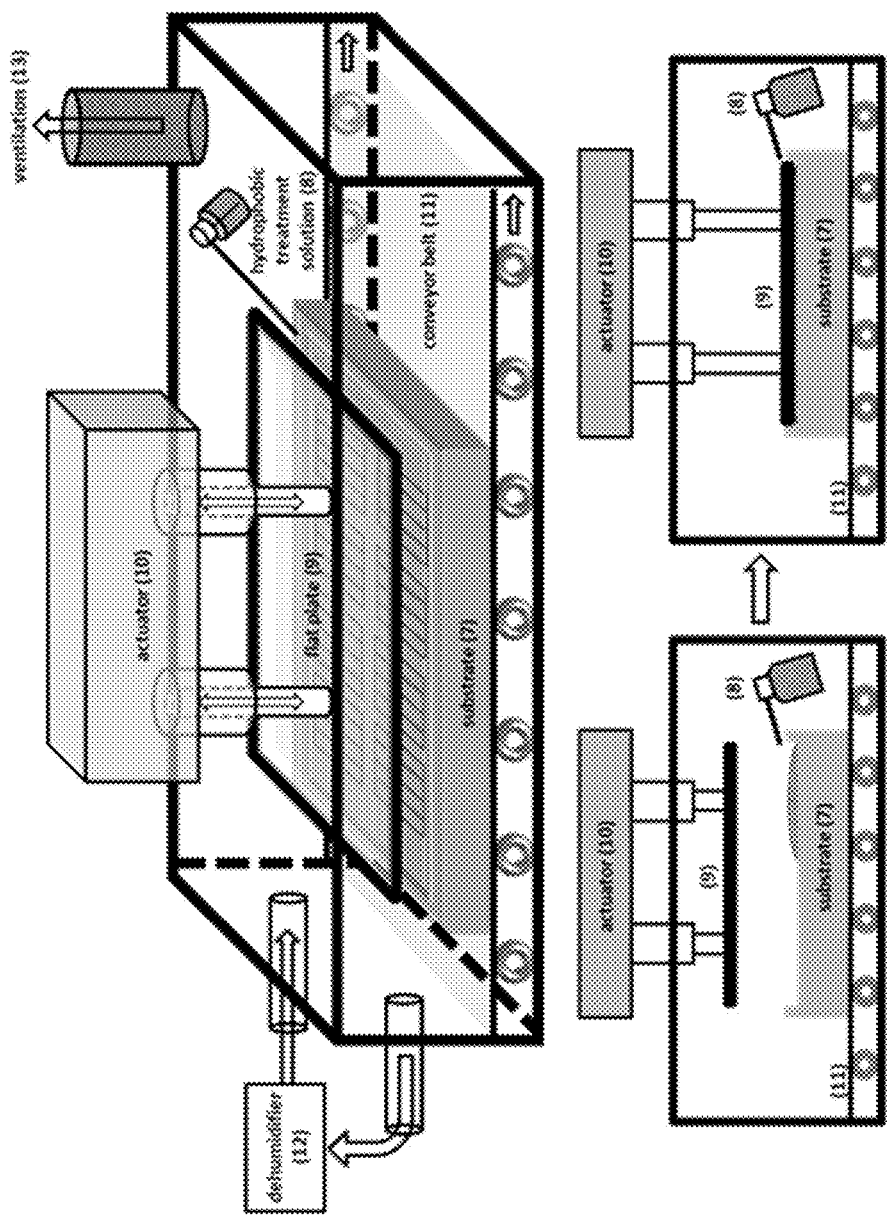
FIG. 10 describes the processes for conducting the hydrophobic treatment on a large flat substrate (7) such as but not limited to the glass surface of a solar panel. The hydrophobic treatment solution (8) such as but not limited to fluoroalkylsilanes in anhydrous solvent is injected by a dispenser onto the polished glass surface of the solar panel. Hydrophobic compounds may include but not limited to trichloro (3,3,3-trifluoropropyl)silane, dichloro-methyl(3,3,3-trifluoropropyl)silane, chloro-dimethyl(3,3,3-trifluoropropyl)silane, trichloro(1H,1H,2H,2H-perfluorooctyl)silane, dichloro-methyl(1H,1H,2H,2H-perfluorooctyl)silane, chloro-dimethyl(1H,1H,2H,2H-perfluorooctyl)silane, trichloro(3,3,4,4,5,5,6,6,7,7,8,8,8-tridecafluorooctyl)silane, dichloro-methyl (3,3,4,4,5,5,6,6,7,7,8,8,8-tridecafluorooctyl)silane, chloro-dimethyl(3,3,4,4,5,5,6,6,7,7,8,8,8-tridecafluorooctyl)silane, trichloro(1H,1H,2H,2H-perfluorodecyl)silane, dichloro-methyl(1H,1H,2H,2H-perfluorodecyl)silane, chloro-dimethyl(1H,1H,2H,2H-perfluorodecyl)silane, trichloro(1H,1H,2H,2H-perfluorododecyl)silane, dichloro-methyl(1H,1H,2H,2H-perfluorododecyl)silane, chloro-dimethyl(1H,1H,2H,2H-perfluorododecyl)silane and derivatives bearing similar structures. Solvent may include but not limited to nonpolar aliphatic (e.g. hexanes) or aromatic (e.g. toluene) compounds, which are miscible with the hydrophobic compounds described above. A flat plate (9) measured the same size as the glass is pushed closer to the glass surface by an actuator (10) to allow the spreading of the solution evenly throughout the whole glass surface. Once the reaction is completed, the actuator lifts the plate and the substrate is moved to the next station by a conveyor belt (11). The humidity level is controlled by the dehumidifier (12) to the optimized level of related humidity. An extra opening on top is used for ventilation (13) of reaction byproduct and solvent vapor. The opening may be coupled with chemical filters.

To generate the desired nanoscopic topography on large substrates, a well-controlled environment may be needed for the hydrophobic treatment. Referring to FIG. 10, the invention is exemplified in a preferred embodiment wherein the self-cleaning surface on a roughed substrate is produced, for example, a large flat substrate (7) such as the glass surface of a solar panel. The hydrophobic treatment solution (8) such as fluoroalkylsilanes in anhydrous solvent is injected by a dispenser onto the polished glass surface of the solar panel. A flat plate (9) measured the same size as the glass is pushed closer to the glass surface by an actuator (10) to allow the spreading of the solution evenly throughout the whole glass surface. Once the reaction is completed, the actuator lifts the plate and the substrate is moved to the next station by a conveyor belt (11). The humidity level is controlled by the dehumidifier (12) to the optimized level of related humidity. An extra opening on top is used for ventilation (13) of reaction byproduct and solvent vapor. The opening may be coupled with chemical filters.

Creating Self-Cleaning Surfaces on Large Flat Substrates Without Solvents

Figure 11:
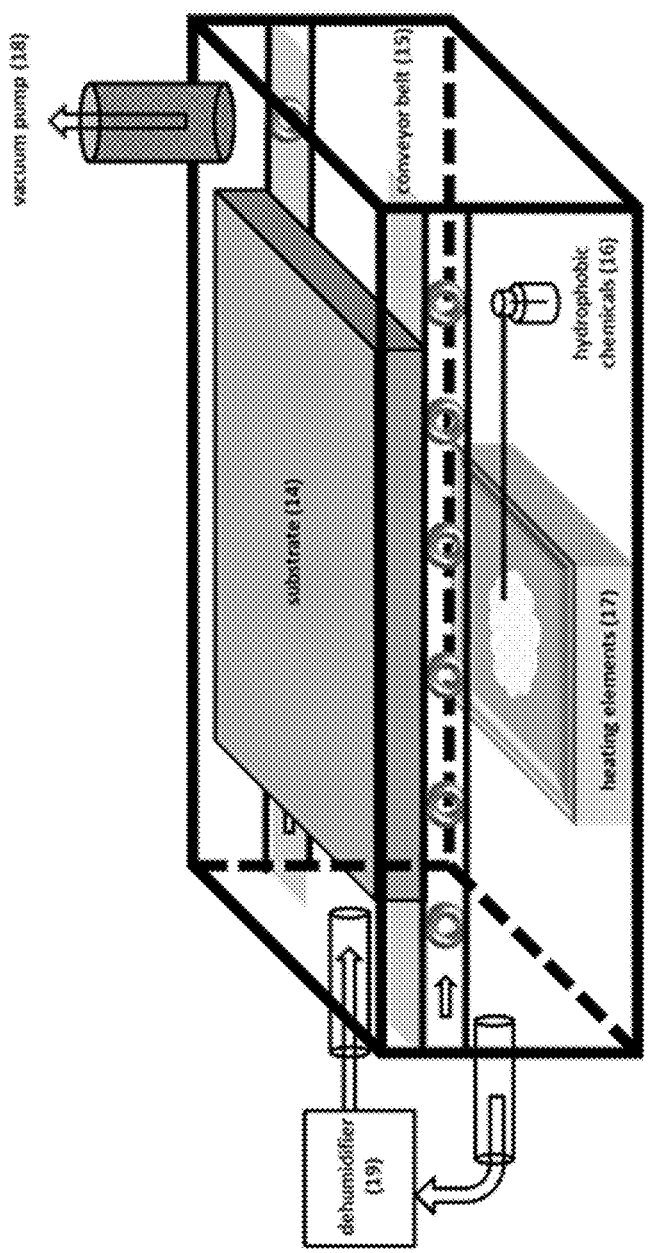
FIG. 11 describes the process for conducting the hydrophobic treatment on a large flat substrate (14), such as a solar panel, without solvents. This process is especially suitable for substrates which may be damaged by the solvent. The substrate is suspended on a conveyor belt (15) located at the top of the enclosure. The hydrophobic chemicals (16) such as fluoroalkylsilanes are injected on the top of heating elements (17). The evaporation of the chemicals is controlled by the heating temperature adjusted by the heating elements as well as the pressure adjusted by the vacuum pump (18). The vacuum pump may be coupled with chemical filters. Once the reaction is completed, the substrate is moved to the next station by the conveyor belt. The humidity level is controlled by the dehumidifier (19) to the optimized level of related humidity.

In another preferred embodiment of the present invention, the self-cleaning surface on a roughed substrate is produced without solvents. FIG. 11 describes the process for conducting the hydrophobic treatment (in absence of solvent) on a large flat substrate (14) such as a solar panel. This process is especially suitable for substrates which may be damaged by the solvent. The substrate is suspended on a conveyor belt (15) located at the top of the enclosure. The hydrophobic chemicals (16) such as fluoroalkylsilanes are injected on the top of heating elements (17). The evaporation of the chemicals is controlled by the heating temperature adjusted by the heating elements as well as the pressure between 0.1 KPa to 100 KPa adjusted by the vacuum pump (18). The vacuum pump may be coupled with chemical filters. Once the reaction is completed, the substrate is moved to the next station by the conveyor belt. The humidity level is controlled by the dehumidifier (19) to the optimized level of related humidity.

Self-Cleaning Properties of Self-Cleaning Coatings on Larger Flat Substrates

In another preferred embodiment of the present disclosure, the resulting self-cleaning coating exhibit self-cleaning properties. This embodiment is exemplified as following: A pre-cleaned solar panel (having the surface area of ~2 m$^2$) was polished with 1.0 µm polycrystalline diamond suspension (MetaDi, Buehler) using a polishing cloth (MasterTex, Buehler) attached to a mechanical polisher. The polished glass surface of the solar panel was cleaned with soap water and washed with de-ionized water thoroughly. After drying, the panel was transferred into a controlled enclosure with relative humidity level of about 20% and subjected to a vapor of trichloro(1H,1H,2H,2H-perfluorooctyl)silane generated by heating the chemical with a hotplate at 120 ° C. After 30 minutes, the panel was removed from the enclosure and cleaned with soap water and washed with de-ionized water thoroughly. The transmission of the resulting coating at the visible light range remains the same as the pristine glass surface of the solar panel (the difference in reflection is undetectable by common human eyes). The critical angle for a 0.05 mL sessile drop of de-ionized water to sliding down the coated surface is less than 30°.

Self-Cleaning Surfaces on a Roughened Non-Flat Substrate

Figure 12:
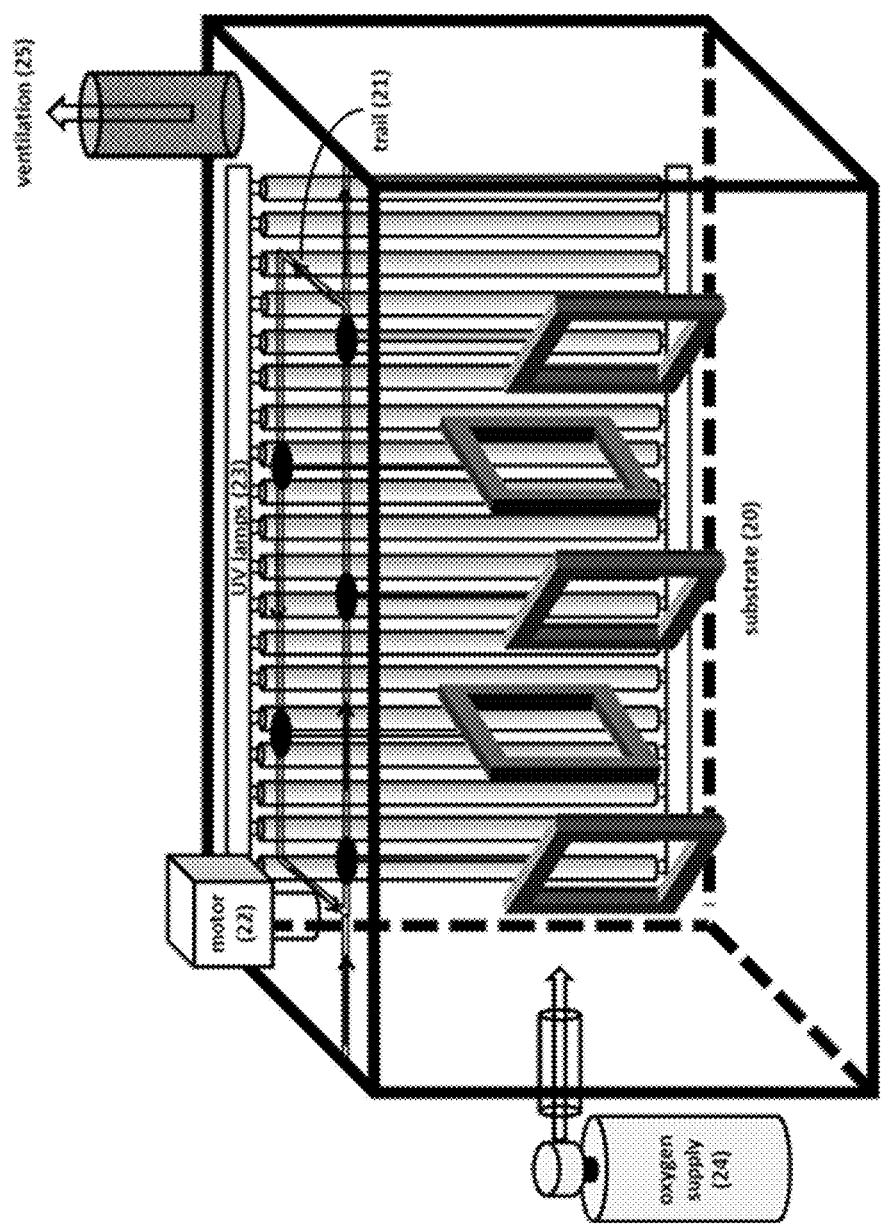
FIG. 12 describes the process for conducting the ozone plasma treatment on non-flat substrates bearing intricate 3-D structures (20) such as extruded aluminum window frames. The process is different than the common ozone plasma treatment on a flat substrate, which can only treat one side of the substrate at a time. The substrate is suspended on a perpetual moving trail (21) operating by a rotational motor (22) once inside the enclosure. The moving trail may have the speed between 0.01 m/s and 1 m/s depending on the time an ozone plasma treatment required. A set of UV lamps (23) are used to convert the oxygen from the atmosphere to active ozone plasma. After the treatment is completed, the substrates are moved to the hydrophobic treatment station (will describe at the following Figure) through the trail which connects to the hydrophobic treatment enclosure. An extra oxygen supply (24) may be needed to improve the efficiency of the treatment and thus reduces the treatment time. An extra opening on top is used for ventilation (25) of ozone and byproducts if workers need to enter the area. The opening may be coupled with chemical filters.

In another exemplary embodiment of the present disclosure, the self-cleaning surface on roughed substrates is produced, for example, on non-flat metal/metal oxide substrates. FIG. 12 describes the process for conducting the ozone plasma treatment on non-flat substrates (20) such as an extruded aluminum frame. The substrate is suspended on a trail (21) operating by a rotational motor (22) once inside the enclosure. A set of UV lamps (23) are used to convert the oxygen from the atmosphere to active ozone plasma. After the treatment is completed, the substrates are moved to the next station through the trail. An extra oxygen supply (24) may be needed to improve the efficiency of the treatment and thus reduces the treatment time. An extra opening on top is used for ventilation (25) of ozone and byproducts if workers need to enter the area. The opening may be coupled with chemical filters.

Figure 13:
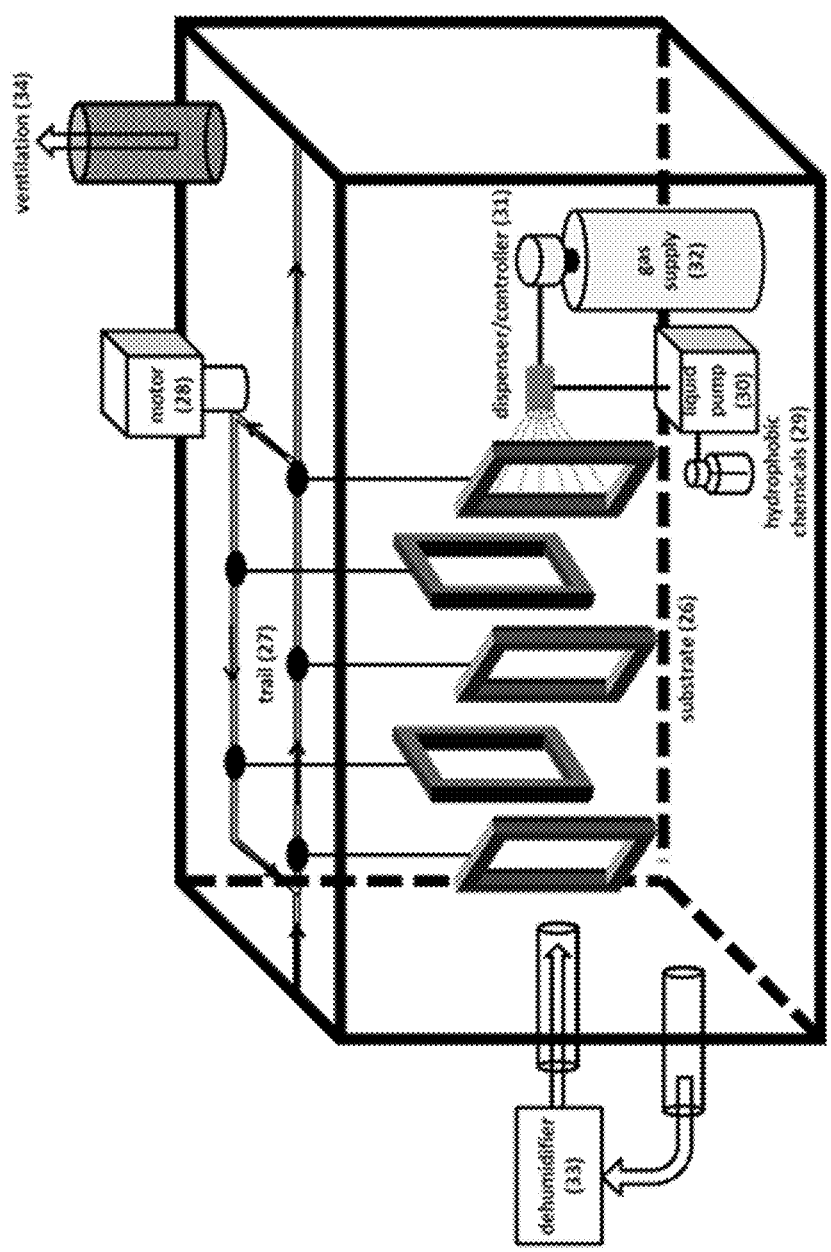
FIG. 13 describes the process for conducting the hydrophobic treatment on non-flat substrates bearing intricate 3-D structures (26) such as extruded aluminum window frames. The process is different than the hydrophobic treatment on a flat substrate illustrated at FIGS. 2 and 3, which can only treat one side of the substrate at a time. The substrate is suspended on a perpetual moving trail (27) operating by a rotational motor (28) once inside the enclosure. The moving trail may have the speed between 0.01 m/s and 1 m/s depending on the time a hydrophobic treatment required. The hydrophobic chemicals (29) such as fluoroalkylsilanes are transported by a liquid pump (30) into the dispenser/controller (31) and an inert gas such as $N_2$ from the gas supply (32) is used as the deliver media to distribute the chemicals onto the substrate surface while the substrates are rotating. The spreading of the chemicals is controlled by adjusting the pressure ratio of the chemical pump and the gas at a ratio between 1:10 to 1:100,000. The gas pressure can range from 100 KPa to 10,000 KPa. The spray rate can range from 1 µL/s to 1 mL/s. The humidity level is controlled though the dehumidifier (33) to the optimized level of related humidity. An extra opening on top is used for ventilation (34) of reaction byproduct and gas if workers need to enter the area. The opening may be coupled with chemical filters.

In another preferred embodiment of the present disclosure, the self-cleaning surface on a roughed non-flat substrate is produced. FIG. 13 describes the process for conducting the hydrophobic treatment on non-flat substrates bearing intricate 3-D structures (26) such as aluminum frames. The substrate is suspended on a trail (27) operating by a rotational motor (28) once inside the enclosure. The hydrophobic chemicals (29) such as fluoroalkylsilanes are transported by a liquid pump (30) into the dispenser/controller (31) and an inert gas such as N$_2$ from the gas supply (32) is used as the deliver media to distribute the chemicals onto the substrate surface while the substrates are rotating. The spreading of the chemicals is controlled by adjusting the pressure ratio of the chemical pump and the gas. The humidity level is controlled though the dehumidifier (33) to the optimized level of related humidity. An extra opening on top is used for ventilation (34) of reaction byproduct and gas if workers need to enter the area. The opening may be coupled with chemical filters.

In another preferred embodiment of the present disclosure, the deposition system can be compartmentalized in a system as follows: The surface is cleaned in the beginning before any deposition is contemplated. This can be done in any different manners, but essentially the surface should be cleaned through polishing, rubbing, washing/drying, wiping etc. The roughing can use a number of processes including nano- or micro-particles flushing the surface with an impact force causing abrasions and form an uneven layer (nm or microns in size depending on the impact frequency, the particle size in use and the material type of particle). Both these processes can be in a single contiguous system or in separate systems. However, the environment must be humidity controlled so if the two processes are kept apart, then the substrate environment must likewise be in a closed system. The vapor phase deposition must likewise be in a controlled manner where the chamber is kept at a specific humidity and temperature, depending on the coating type to form the self-cleaning layer. For example, a jet plume of the hydrophobic chemicals will hit the roughened substrate surface either laterally or vertically, depending on the geometry of the substrates and form the nano/micro layer that has self-cleaning property.

While the invention described herein specifically focuses on compositions and methods for making and using self-cleaning surfaces, one of ordinary skills in the art, with the benefit of this disclosure, would recognize the extension of such approach to other systems.

The embodiments described herein are to be construed as illustrative and not as constraining the remainder of the disclosure in any way whatsoever. While the embodiments have been shown and described, many variations and modifications thereof can be made by one skilled in the art without departing from the spirit and the teachings of the invention. Accordingly, the scope of protection is not limited by the description set out above, but is only limited by the claims, including all equivalents of the subject matter of the claims. The disclosure of all patents, patent applications and publications cited herein are hereby incorporated herein by reference, to the extent that they provide procedural or other details consistent with and supplementary to those set forth herein.

REFERENCES

1. Liao, K-S., Wan, A., Batteas, J. D., Bergbreiter, D.E., "Superhydrophobic surfaces formed using layer-by-layer self-assembly with aminated multiwall carbon nanotubes" *Langmuir* 2008, 24, 4245-4253.
2. Furmidge, C. G. L. *J. Colloid Sci.* 1962, 17, 309-324.
3. Jiang et al. United State Patent Application US 2010/0203287 A1 Aug. 12, 2010
4. Zhai et al. United State Patent Application US 2006/0029808 A1 Feb. 9, 2006
5. Dave et al. United State Patent Application US 2006/0292345 A1 Dec. 28, 2006

What is claimed is:
1. A method of forming a self-cleaning coating on a substrate comprising the steps of:
   selecting a substrate;
   cleaning the substrate;

roughening the substrate in a roughening station, wherein the roughening consists of
a first roughening step with a first abrasive moved by a vertical actuator to contact the substrate to create a first set of microscopic grooves, wherein the substrate is roughened by a back-and-forth motion along a first axis performed by a first actuator to form the first set of microscopic grooves, and the first set of microscopic grooves range in depth from about 1 µm to about 1 mm, and
optionally includes a second roughening step with the first abrasive to create a second set of microscopic grooves, wherein the substrate is roughened by another back-and-forth motion along a second axis performed by a second actuator to form the second set of microscopic grooves;
washing the substrate with de-ionized water; and
transferring the substrate to a deposition station and coating the roughened surface with at least one hydrophobic chemical agent, wherein the at least one hydrophobic chemical agent is a chlorosilane or a derivative bearing similar structure, the coating step is performed by evaporating the at least one hydrophobic chemical agent with a heating element in a well-controlled environment, wherein the well-controlled environment is a chamber providing humidity control, the hydrophobic chemical agent binds to the roughened surface and formation of the coating creates a nanoscopic topography of nanoscopic features on the microscopic grooves that range in depth from about 10 nm to about 1 µm, and wherein the coated substrate has a light transmission or reflection similar to or higher than that of the uncoated substrate.

2. The method of claim 1, wherein the substrate is a flat or a non-flat-substrate.

3. The method of claim 1, wherein the substrate comprises metals, metal oxides, organic/inorganic composites containing metals/metal oxides and plastic with silicon dioxide or metal oxides layer by sol-gel formation or other methods.

4. The method of claim 1, wherein the step of roughening the substrate to create the microscopic grooves comprises using a mechanical grinder or a polisher.

5. The method of claim 4, wherein the mechanical grinder is used with grinding disc or an abrasive paper.

6. The method of claim 4, wherein the polisher is used with a polishing suspension.

7. The method of claim 4, further comprising using at least one abrasive, wherein the hardness of the at least one abrasive is greater than that of the substrate.

8. The method of claim 7, wherein the abrasive is selected from the group consisting of diamond, carbonado, boron, boron nitride, corundum, silicon carbide, tungsten carbide, titanium carbide, chromium, silicon nitride, topaz, zirconia, tungsten, quartz and glass.

9. The method of claim 1, wherein the step of roughening and activating the substrate is by ozone plasma treatment.

10. The method of claim 1, wherein the at least one hydrophobic chemical agent also comprises a fluoroalkylsilane selected from the group consisting of trichloro(3,3,3-trifluoropropyl)silane, dichloro-methyl(3,3,3-trifluoropropyl)silane, chloro-dimethyl(3,3,3-trifluoropropyl)silane, trichloro(1H,1H,2H,2H-perfluorooctyl)silane, dichloro-methyl(1H,1H,2H,2H-perfluorooctyl)silane, chloro-dimethyl(1H,1H,2H,2H-perfluorooctyl)silane, trichloro(3,3,4,4,5,5,6,6,7,7,8,8,8-tridecafluorooctyl)silane, dichloro-methyl(3,3,4,4,5,5,6,6,7,7,8,8,8-tridecafluorooctyl)silane, chlorodimethyl(3,3,4,4,5,5,6,6,7,7,8,8,8-tridecafluorooctyl)silane, trichloro(1H,1H,2H,2H-perfluorodecyl)silane, dichloro-methyl(1H,1H,2H,2H-perfluorodecyl)silane, chloro-dimethyl(1H,1H,2H,2H-perfluorodecyl)silane, trichloro(1H,1H,2H,2H-perfluorododecyl)silane, dichloro-methyl(1H, 1H,2H,2H-perfluorododecyl)silane, chloro-dimethyl(1H,1H,2H,2H-perfluorododecyl)silane and derivatives bearing similar structures.

11. The method of claim 1, wherein the at least one hydrophobic chemical agent is dichlorosilane, trichlorosilane, chlorotrimethylsilane, dichlorodimethylsilane, trichloromethylsilane, chlorophenylsilane, dichlorophenylsilane, trichlorophenylsilane, chloromethylphenylsilane, chlorodimethylphenylsilane, dichloromethylphenylsilane, chlorodimethylphenethylsilane, dichloromethylphenethylsilane, trichlorophenethylsilane, chlorodimethyldodecylsilane, dichloromethyldodecylsilane, trichlorododecylsilane, chlorodecyldimethylsilane, dichlorodecylmethylsilane, trichlorodecyl silane, chlorodimethyloctadecylsilane, dichloromethyloctadecylsilane, trichlorooctadecylsilane, chlorodimethyloctylsilane, dichloromethyloctylsilane, trichlorooctylsilane, chlorodimethylhexylsilane, dichloromethylhexylsilane, trichlorohexylsilane, chlorodimethylthexylsilane, dichloromethylthexylsilane, trichlorothexylsilane, allyldichloromethylsilane, allylchlorodimethylsilane, allyltrichlorosilane, (cyclohexylmethyl)chlorodimethylsilane, (cyclohexylmethyl)dichloromethylsilane, or (cyclohexylmethyl)trichlorosilane.

12. The step of claim 1, wherein the humidity is controlled to about 20% of related humidity.

13. The method of claim 1, further comprising drying the substrate in ambient conditions.

14. The method of claim 1, wherein the coating step is conducted by controlling the evaporation of the hydrophobic chemical agent.

15. The method of claim 14, wherein controlling the evaporation of the hydrophobic chemical agent comprises controlling the pressure of injection and the temperature of heating of the hydrophobic chemical agent.

16. The method of claim 1, wherein the at least one hydrophobic chemical agent is solvent-free.

* * * * *